(12) United States Patent
Masui

(10) Patent No.: US 8,185,950 B2
(45) Date of Patent: May 22, 2012

(54) IMAGE FORMING APPARATUS, METHOD FOR MANAGEMENT OF AUTHENTICATING INFORMATION AND COMPUTER READABLE MEDIUM STORING PROGRAM THEREOF

(75) Inventor: Takanori Masui, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 698 days.

(21) Appl. No.: 12/099,864

(22) Filed: Apr. 9, 2008

(65) Prior Publication Data

US 2009/0055925 A1    Feb. 26, 2009

(30) Foreign Application Priority Data

Aug. 24, 2007   (JP) .................. 2007-218261

(51) Int. Cl.
*G06F 21/00* (2006.01)
*G06F 11/00* (2006.01)
*G06F 12/14* (2006.01)
*G06F 12/16* (2006.01)
*G08B 23/00* (2006.01)

(52) U.S. Cl. .......... 726/20; 713/182; 713/186; 713/172; 726/19

(58) Field of Classification Search .................. None
See application file for complete search history.

(56) References Cited

U.S. PATENT DOCUMENTS

| | | | | |
|---|---|---|---|---|
| 6,026,492 A * | 2/2000 | Cromer et al. | ............... | 726/35 |
| 6,044,470 A * | 3/2000 | Kuriyama | ................. | 726/19 |
| 6,128,511 A | 10/2000 | Irie | | |
| 6,990,588 B1 * | 1/2006 | Yasukura | ................ | 713/186 |
| 2002/0019939 A1 * | 2/2002 | Yamamoto et al. | ........... | 713/172 |
| 2002/0051167 A1 * | 5/2002 | Francis et al. | ................ | 358/1.14 |
| 2005/0015601 A1 * | 1/2005 | Tabi | ............................. | 713/182 |
| 2005/0144354 A1 * | 6/2005 | Murashita | ................... | 711/100 |
| 2006/0153380 A1 * | 7/2006 | Gertner | ........................ | 380/221 |
| 2007/0220269 A1 * | 9/2007 | Suzuki | .......................... | 713/182 |
| 2009/0247123 A1 * | 10/2009 | Lee et al. | ..................... | 455/410 |

FOREIGN PATENT DOCUMENTS

| | | |
|---|---|---|
| JP | 326126 A | 2/1991 |
| JP | 1051372 A | 2/1998 |
| JP | 11313148 A | 11/1999 |
| JP | 2002-259305 A | 9/2002 |
| JP | 2002318788 A | 10/2002 |
| JP | 2002366938 A | 12/2002 |
| JP | 200330597 A | 1/2003 |
| JP | 2007115136 A | 5/2007 |

OTHER PUBLICATIONS

Japanese Patent Office Action dated Nov. 30, 2011 and English-language translation thereof.

* cited by examiner

*Primary Examiner* — Shin-Hon Chen
(74) *Attorney, Agent, or Firm* — Sughrue Mion, PLLC

(57) ABSTRACT

An information forming apparatus includes: a communication unit that carries out data communication with an authentication card inserted into a card slot; an authentication unit that authenticates that a user who attempts to operate the apparatus is an authorized user by sending entered authenticating information to the authentication card; a storing unit that stores the entered authenticating information; and a process execution unit that, when a process is invoked that requires input of authenticating information to the authentication card, executes the process using the authenticating information stored in the storing unit.

13 Claims, 8 Drawing Sheets

IMAGE FORMING APPARATUS, METHOD FOR MANAGEMENT OF AUTHENTICATING INFORMATION AND COMPUTER READABLE MEDIUM STORING PROGRAM THEREOF

CROSS-REFERENCE TO RELATED APPLICATIONS

This application is based on and claims priority under 35 USC 119 from Japanese Patent Application No. 2007-218261 filed Aug. 24, 2007.

BACKGROUND

1. Technical Field

The present invention relates to an image forming apparatus, a method for management of authenticating information, and a computer readable medium storing a program thereof.

2. Related Art

An image forming apparatus called a so-called multi-function device like a printer having facsimile and scanner functions has an authentication function to identify a user, because the apparatus is shared by plural users. For the purpose of doing such authentication, an IC card like the one called a so-called smart card is used.

When using the image forming apparatus in which authentication is performed using such an IC card, a user is allowed to log in and use the image forming apparatus only after the user is authenticated based on user-entered authenticating information called Personal Identification Number (PIN).

This type of IC card may be provided as one in which a private key for a Public Key Infrastructure (PKI) scheme is stored, wherein it is possible to append a digital signature to a variety of data by generating a signature value using the private key stored within the IC card.

For an IC card that is generally used for authentication, after you insert the IC card into a card reader, PIN information matching is checked and, once you have successfully been authenticated, a PIN information matching verified state continues until the IC card is removed from the card reader.

For some IC cards such as a Personal Identity Verification (PIV) card which is an ID card issued by the U.S. federal government, re-input of PIN information to the IC card and information matching check are required for security protection purposes each time a certain operation is performed with the IC card (e.g., reading a certificate, digital signature using a private key, and decryption using a private key).

If you intend to append your digital signature to image data and others using such an IC card, you have to not only enter PIN information for being authenticated, but also re-enter PIN information when using your private key inside the IC card.

After you have been authenticated using your IC card, if you initiate a scan job in which signing with your digital signature needs to be done plural times in a job or plural jobs, you have to enter PIN information whenever a digital signature is required. An example of a scan job in which signing with your digital signature needs to be done plural times in a job is a case where the, after contents of scanned pages are converted into digitally signed PDF data, you attach this PDF data to a digitally signed e-mail and transmit the e-mail. In such case, the user is required to enter PIN information when PDF data is digitally signed and when the e-mail is digitally signed.

In general, an image forming apparatus is equipped with a user interface device having small operation buttons and the like, and their operability is not always good. Consequently, the need to enter PIN information each time a process that uses information stored inside the IC card is performed requires the user to perform operation that bothers the user.

SUMMARY

According to an aspect of the invention, there is provided an image forming apparatus including a communication unit that carries out data communication with an authentication card inserted into a card slot; an authentication unit that authenticates that a user who attempts to operate the apparatus is an authorized user by sending entered authenticating information to the authentication card; a storing unit that stores the entered authenticating information; and a process execution unit that, when a process is invoked that requires input of authenticating information to the authentication card, executes the process using the authenticating information stored in the storing unit.

BRIEF DESCRIPTION OF THE DRAWINGS

An exemplary embodiment of the present invention will be described in detail based on the following figures, wherein.

DETAILED DESCRIPTION

In the following, an exemplary embodiment of the present invention will be described in detail with reference to the drawings.

Figure 1:
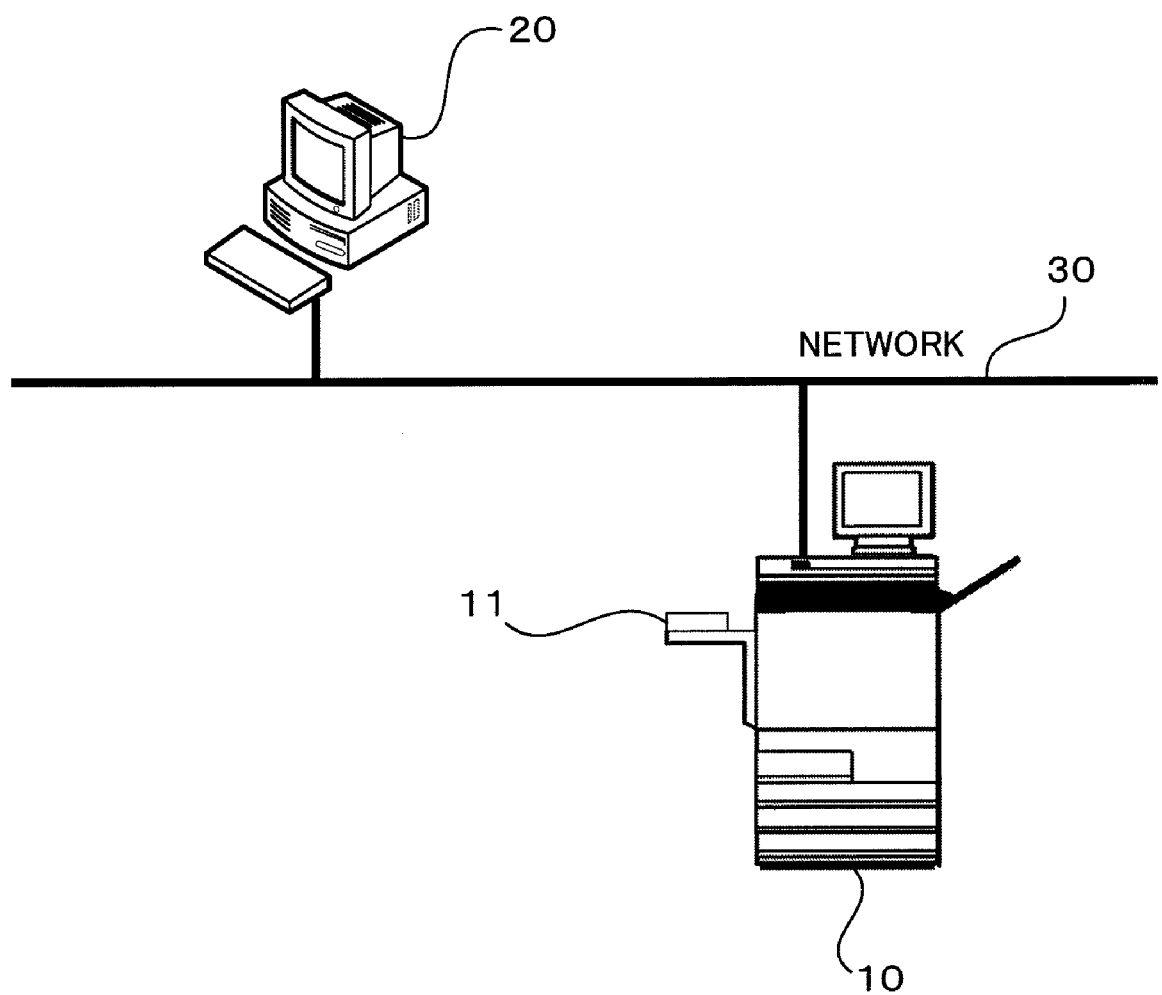
FIG. 1 depicts a framework of an image processing system including an image forming apparatus according to one exemplary embodiment of the invention.

FIG. 1 depicts a framework of an image processing system including an image forming apparatus according to one exemplary embodiment of the invention.

As shown in FIG. 1, the image processing system includes an image forming apparatus 10 and a terminal device 20 interconnected via a network 30. The terminal device 20 generates print data such as print jobs and transmits the print data to the image forming apparatus 10. The image forming apparatus 10 accepts the print data transmitted from the terminal device 20 and outputs an image corresponding to the print data on printing paper.

Figure 2:
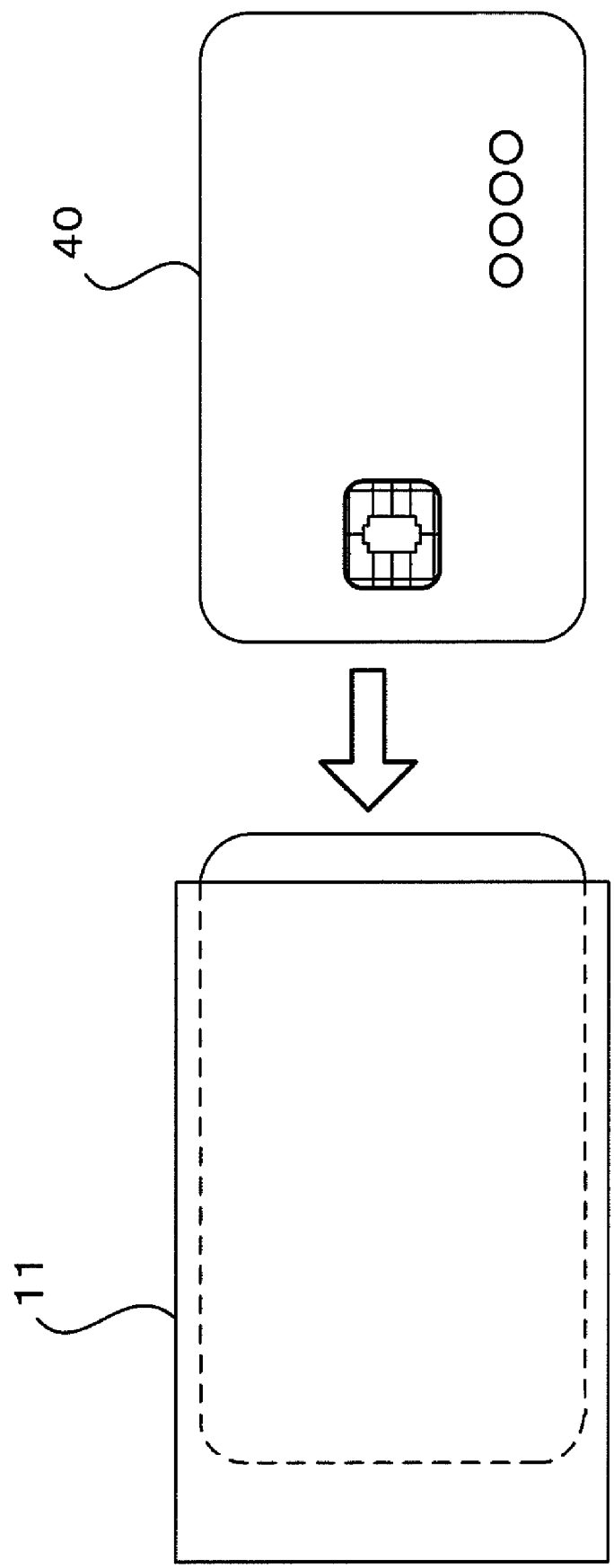
FIG. 2 depicts an exterior view of an IC card reader 11.

The image forming apparatus 10 of the present exemplary embodiment is equipped with an IC card reader 11 for reading an IC card like a smart card having a built-in computing function. The IC card reader 11 has a card slot into which a contact IC card with a terminal is inserted, as is depicted in FIG. 2. The card slot functions as a communication unit for data communication with an IC card 40 inserted in it.

Figure 3:
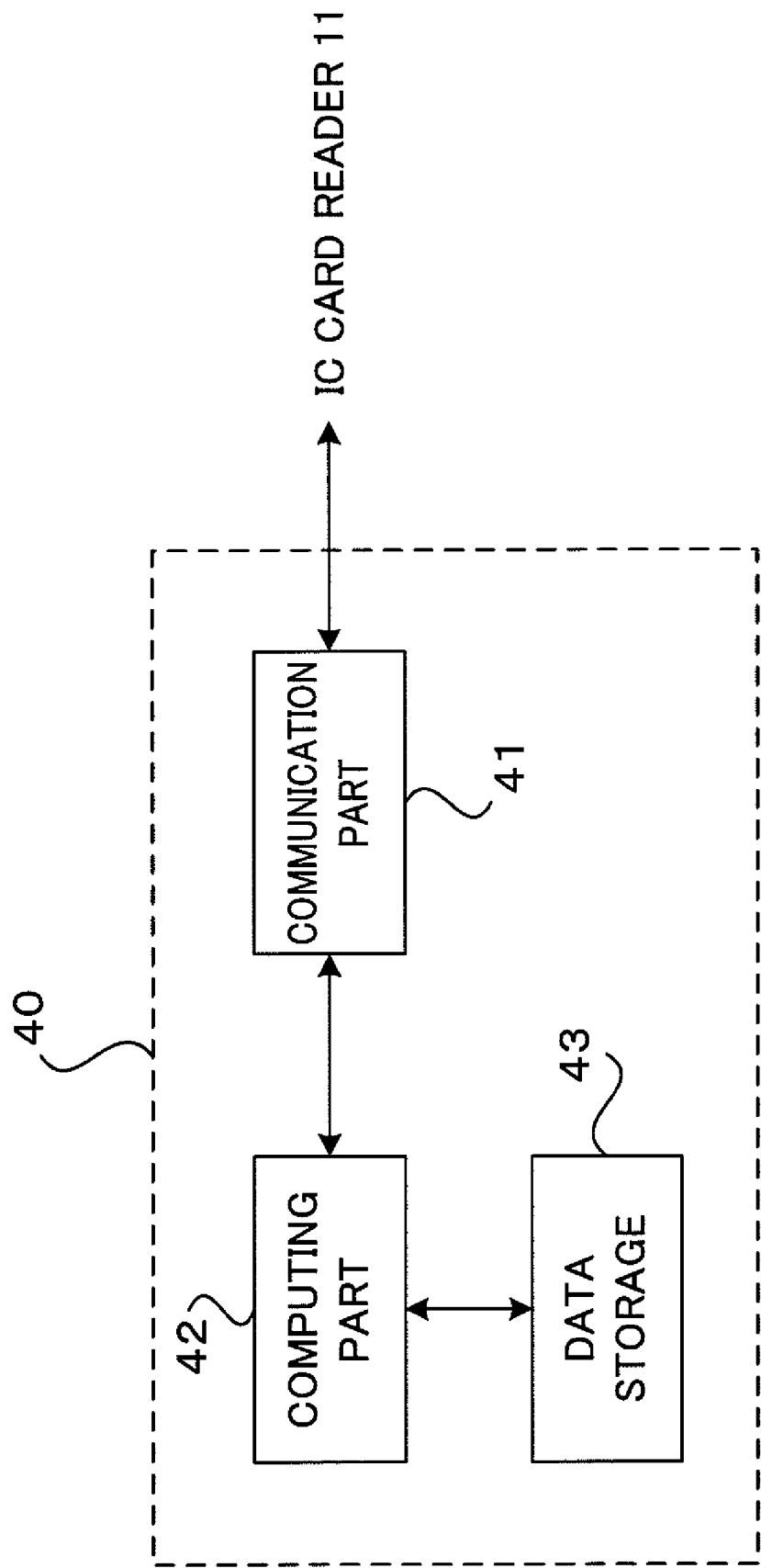
FIG. 3 depicts a hardware structure of an IC card 40.

Then, a hardware structure of the IC card 40 is depicted in FIG. 3. As shown in FIG. 3, the IC card 40 includes a communication part 41, a computing part 42, and a data storage 43.

The communication part 41 sends and receives data to/from the IC card reader 11. In the data storage 43, a variety of information such as PIN information, private key information and certificate information is stored. The computing part 42 executes arithmetic processing tasks for carrying out an authentication function to verify a match between PIN information input via the communication part 41 and PIN information stored in the data storage 43, a digital signature function to generate a signature value by encrypting a hash value with a private key, and others.

Figure 4:
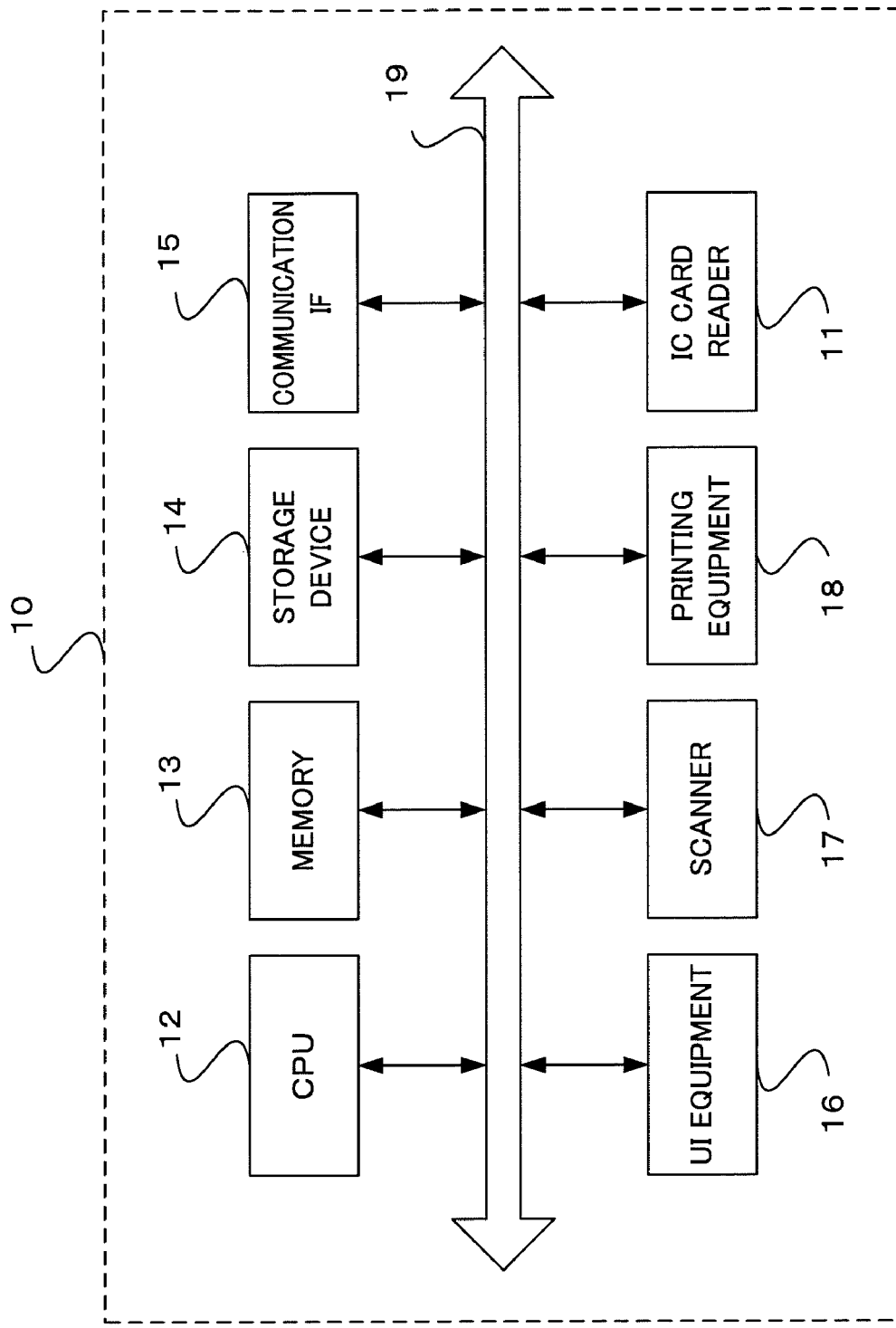
FIG. 4 a block diagram showing a hardware structure of the image forming apparatus 10 according to the one exemplary embodiment of the invention.

Then, a hardware structure of the image forming apparatus 10 of the present exemplary embodiment is depicted in FIG. 4.

As shown in FIG. 4, the image forming apparatus 10 includes a CPU 12, a memory 13, a storage device 14 such as a hard disk drive (HDD), a communication interface (IF) 15 for transmitting and receiving data to/from a remote terminal device 20 and others via the network 30, user interface (UI) equipment 16 including a touch panel or a liquid crystal display and a keyboard, a scanner 17, printing equipment 18, and the IC card reader 11. These components are interconnected via a control bus 19.

The CPU 12 executes prearranged processing based on a control program stored in the memory 13 or storage device 14 and controls the operation of the image forming apparatus 10.

Figure 5:
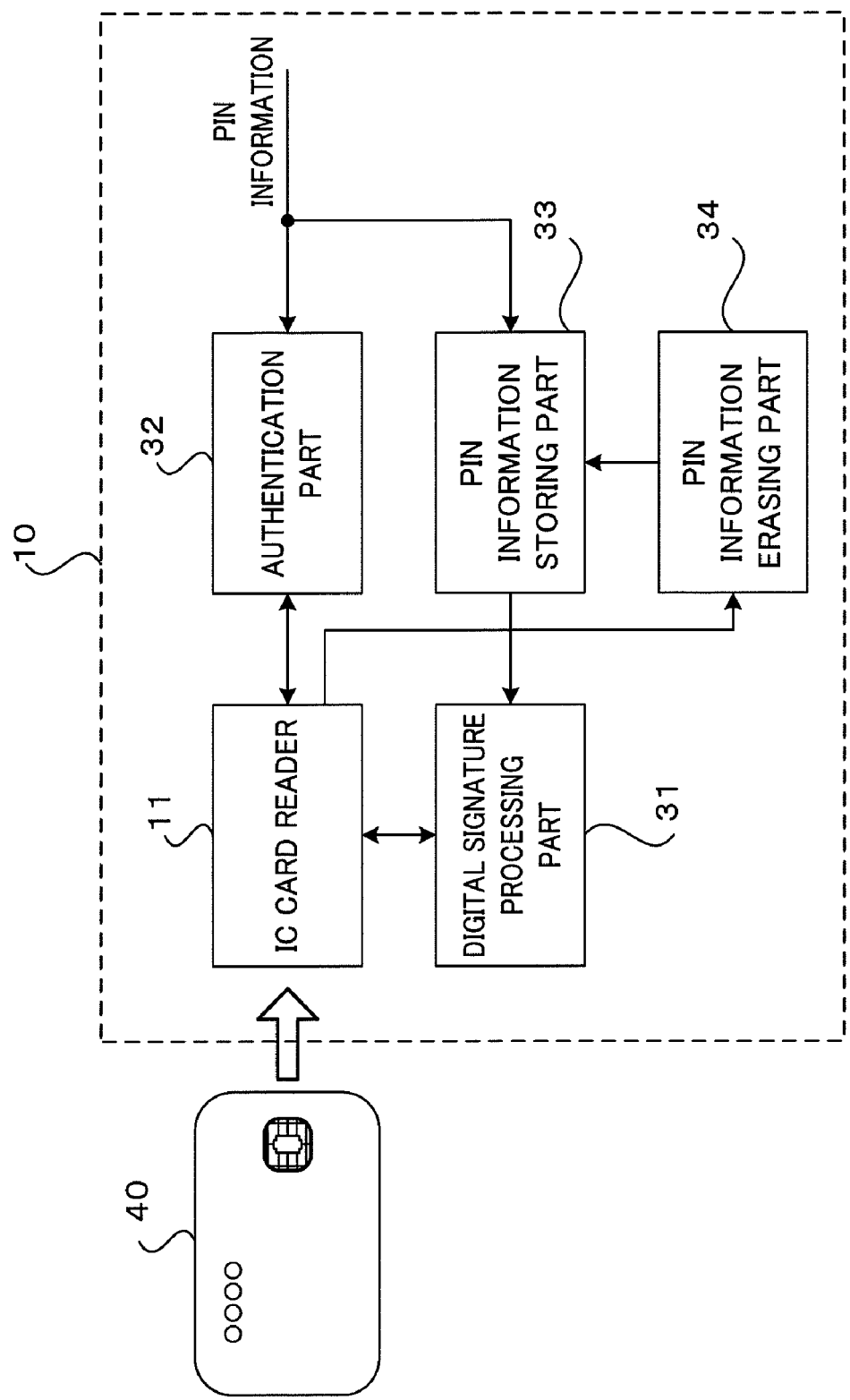
FIG. 5 is a block diagram showing an arrangement of functions of the image forming apparatus 10 according to the one exemplary embodiment of the invention.

FIG. 5 is a block diagram showing an arrangement of functions of the image forming apparatus 10, which are realized by the execution of the above control program.

As shown in FIG. 5, the image forming apparatus 10 of the present exemplary embodiment includes the IC card reader 11, a digital signature processing part 31, an authentication part 32, a PIN information storing part 33, and a PIN information erasing part 34.

The authentication part 32 authenticates that a user who attempts to operate the apparatus is an authorized user by sending PIN information entered via the UI equipment 16 or the like to the IC card 40.

The PIN information storing part 33 temporarily stores PIN information entered via the UI equipment 16 or the like.

The digital signature processing part 31 executes a digital signature process in which a signature value is obtained by sending PIN information stored in the PIN information storing part 33 and a hash value for data to be digitally signed and the obtained signature value is attached to the data.

The PIN information erasing part 34 erases PIN information stored in the PIN information storing part 33, once the IC card 40 has been removed from the IC card reader 11. When the PIN information erasing part 34 erases PIN information stored in the PIN information storing part 33, PIN information erasure can be performed reliably by overwriting the PIN information storage area with other data such as all "0s" or "1s".

Figure 6:
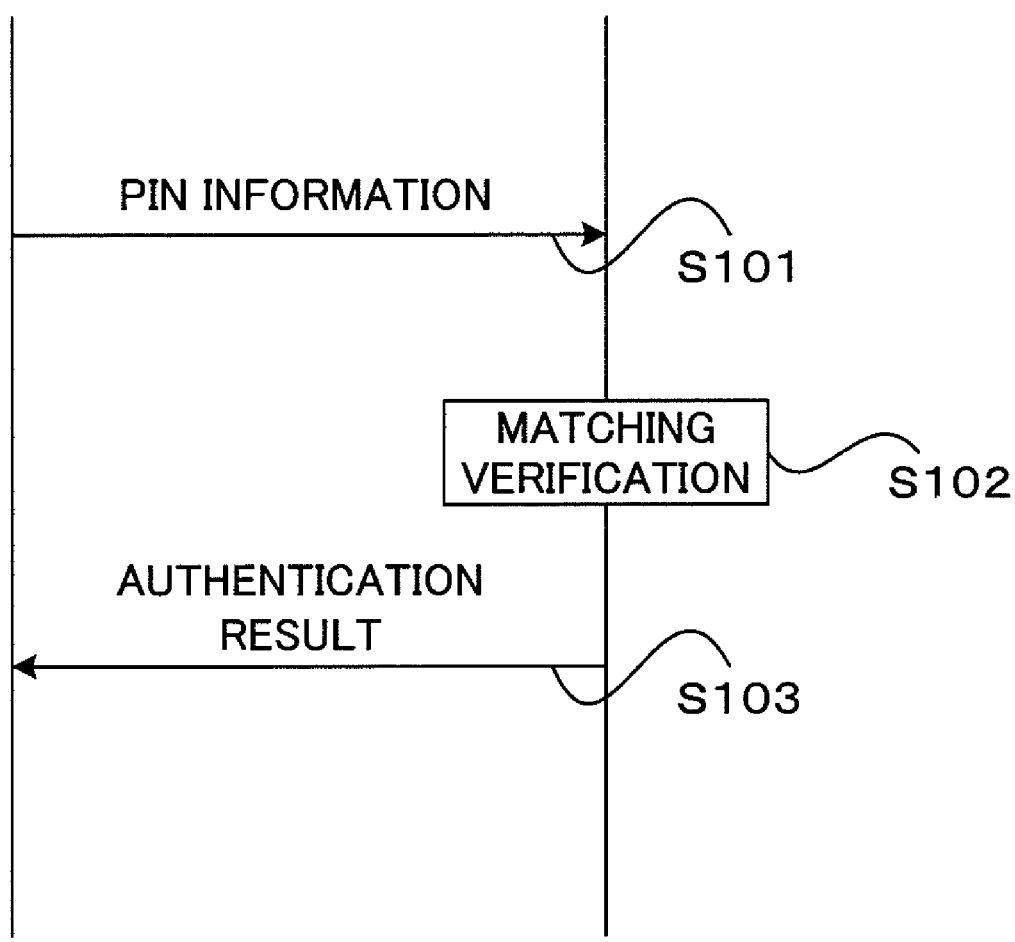
FIG. 6 is a sequence chart illustrating an authentication process that is executed by an authentication part 32.

Then, an authentication process that is executed by the authentication part 32 is explained with reference to a sequence chart of FIG. 6.

Once the IC card 40 has been inserted into the IC card reader 11, as the authentication process starts, the authentication part 32 prompts the user to enter PIN information. When PIN information is entered via the UI equipment 16 or the like, the authentication part 32 transfers the entered PIN information to the IC card 40 (step S101).

The computing part 42 of the IC card 40 verifies whether the PIN information transferred from the authentication part 32 matches with PIN information stored in the data storage 43 (step S102). If there is a match between these PINs, the IC card 40 sends a successful authentication result to the authentication part 32; in case of a mismatch, the IC card 40 sends an unsuccessful authentication result to the authentication part 32 (step S103).

In the image forming apparatus 10, once a successful authentication result has been received from the IC card 40, the PIN information storing part 33 ascertains the PIN information and a process such as login permission is executed.

Figure 7:
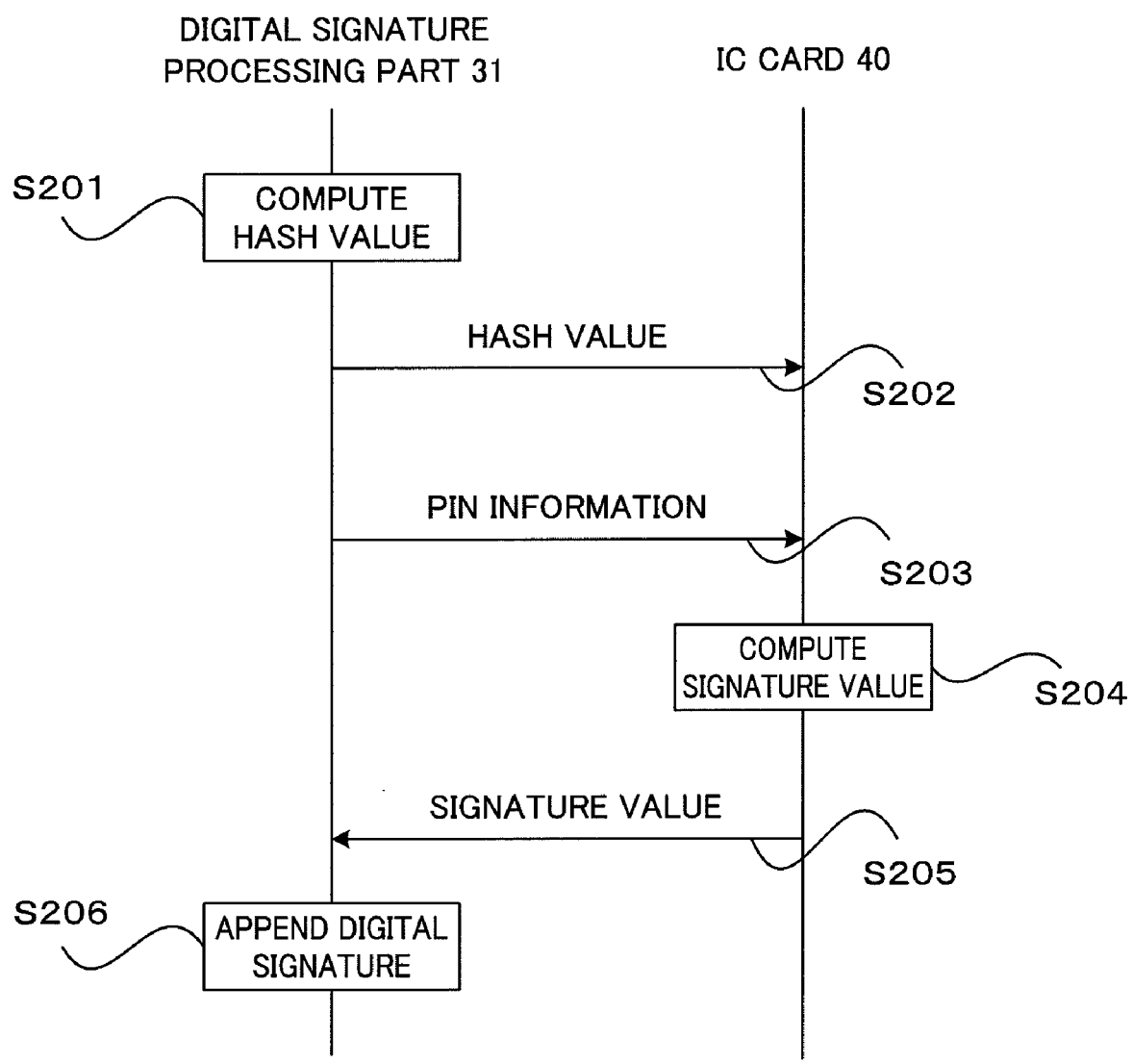
FIG. 7 is a sequence chart illustrating a digital signature process that is executed by a digital signature processing part 31.

Next, a digital signature process that is executed by the digital signature processing part 31 is explained with reference to a sequence chart of FIG. 7.

When there occurs a need to append a digital signature to data to transmit or the like, the digital signature processing part 31 computes a hash value for data to be digitally signed (step S201). Then, the digital signature processing part 31 transfers the obtained hash value to the IC card 40 (step S202). If the IC CARD 40 sends back a response requiring PIN information to be input again, the digital signature processing part 31 transfers PIN information stored in the PIN information storing part 33 to the IC card 40 (step S203).

Then, the computing part 42 of the IC card 40, after verifying a match between the PIN information transferred thereto and PIN information stored in the data storage 43, generates a signature value by encrypting the hash value transferred thereto with a private key stored in the data storage 43 (step S204). The obtained signature value is sent from the IC card 40 to the digital signature processing part 31 (step S205). If the IC card 40 does not issue a request for PIN information re-input in the step S202 (if the signature value is successfully generated without re-input of PIN information), the step S203 is not executed.

Once having received the signature value from the IC card 40, the digital signature processing part 31 executes the digital signature process by attaching this signature value to the data.

Figure 8:
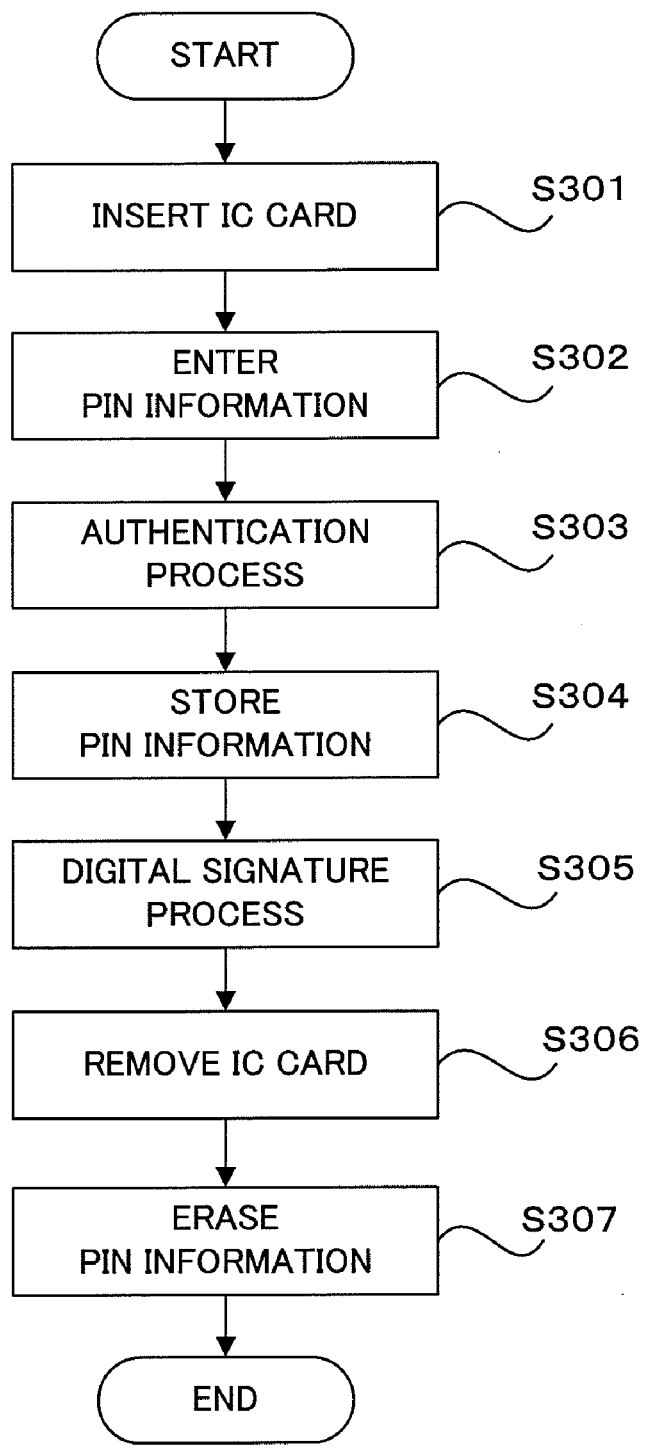
FIG. 8 is a flowchart illustrating the operation of the image forming apparatus 10 according to the one exemplary embodiment of the invention.

Next, the operation of the image forming apparatus 10 of the present exemplary embodiment is explained with reference to a flowchart of FIG. 8 involving a series of steps starting with insertion of the IC card 40 into the IC card reader 11 by the user, going through the digital signature process, until removing the IC card 40 from the card slot.

When the user inserts the IC card 40 into the IC card reader 11 (step S301), the authentication part 32 prompts the user to enter PIN information (step S302). When the user enters PIN information via the UI equipment 16 or the like, the authentication part 32 executes the authentication process by transferring the entered PIN information to the IC card 40 (step S303). As a result of the authentication process, upon successful authentication, the user has now logged into the image forming apparatus 10, which means that the user is now allowed to operate the image forming apparatus 10 for a desired purpose.

In the image forming apparatus 10, the PIN information entered via the UI equipment 16 or the like is stored into the PIN information storing part 33 (step S304).

When the user requests the apparatus to append a digital signature to certain data, the digital signature processing part 31 executes the digital signature process by sending the PIN information stored in the PIN information storing part 33 to the computing part 42 of the IC card 40 (step S305). Thus, the user can perform digital signature without being prompted to enter PIN information.

When the IC card 40 is removed from the card slot of the IC card reader 11, the PIN information erasing part 34 erases the PIN information stored in the PIN information storing part 33 to prevent the PIN information from being used fraudulently (step S307). In consequence, no PIN information exists in the PIN information storing part 33, when the IC card 40 is not present in the IC card reader 11.

In the image forming apparatus 10 of the present exemplary embodiment, as described above, PIN information entered for the authentication process is stored in the PIN information storing part 33. When a process is invoked that requires input of PIN information, the process is executed using the PIN information stored in the PIN information storing part 33 without prompting the user to enter PIN information.

For the image forming apparatus 10 of the present exemplary embodiment, while the description is given using the digital signature process as an example of a process that requires input of PIN information to the IC card 40, the invention can equally be applied for cases even when another process is invoked that requires input of PIN information to the IC card 40.

Furthermore, for the image forming apparatus 10 of the present exemplary embodiment, while the description is given for the case where the IC card is used as an authentication card for user authentication, the present invention is not limited to such case. The invention can equally be applied for cases where user authentication is performed using another type of IC card or another medium for authentication purposes other than the IC card.

The present invention may be embodied in other specific forms without departing from its spirit or characteristics. The described exemplary embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. An information forming apparatus comprising:
    a communication unit that carries out data communication with an authentication card inserted into a card slot;
    an authentication unit that authenticates that a user who attempts to operate the apparatus is an authorized user by sending entered authenticating information to the authentication card;
    a storing unit that stores the entered authenticating information;
    a process execution unit that, when a process is invoked that requires input of authenticating information to the authentication card, executes the process using the authenticating information stored in the storing unit; and
    an erasure unit that always erases the authenticating information stored in the storing unit in response to removal of the authentication card from the card slot when power of the apparatus is ON,
    wherein the erasing occurs before a next instance when the power of the apparatus is OFF, and
    wherein no authentication information exists in the storing unit while the authentication card is not inserted in the card slot.

2. The information forming apparatus according to claim 1, wherein the process that requires input of authenticating information, which is executed by the process execution unit, is a process of appending a digital signature.

3. The information forming apparatus according to claim 2, wherein the process of appending a digital signature is performed by obtaining a signature value by sending the authenticating information stored in the storing unit and a hash value for data to be attached a digital signature to the authentication card and attaching the obtained signature value to the data.

4. The information forming apparatus according to claim 1, wherein the erasure unit erases the authenticating information stored in the storing unit by overwriting the authentication information stored in the storage unit with other data.

5. The information forming apparatus according to claim 4, wherein the other data comprises all "0s" or all "1s".

6. A method for management of authenticating information comprising:
    authenticating that a user who attempts to operate an apparatus is an authorized user by sending entered authenticating information to an authentication card inserted into a card slot;
    storing the entered authenticating information;
    when a process is invoked that requires input of authenticating information to the authentication card, executing the process using the stored authenticating information; and
    always erasing the stored authenticating information in response to removal of the authentication card from the card slot when power of the apparatus is ON,
    wherein the erasing occurs before a next instance when the power of the apparatus is OFF, and
    wherein no authentication information exists in the storing unit while the authentication card is not inserted in the card slot.

7. The method for management of authenticating information according to claim 6, wherein the process that requires input of authenticating information is a process of appending a digital signature.

8. The method for management of authenticating information according to claim 6, wherein the erasing the stored authenticating information comprises overwriting the authentication information with other data.

9. The method for management of authenticating information according to claim 8, wherein the other data comprises all "0s" or all "1s".

10. A non-transitory computer readable medium storing a program comprising instructions causing a computer to perform the following:
    authenticating that a user who attempts to operate an apparatus is an authorized user by sending entered authenticating information to an authentication card inserted into a card slot;
    storing the entered authenticating information;
    when a process is invoked that requires input of authenticating information to the authentication card, executing the process using the stored authenticating information; and
    always erasing the stored authenticating information in response to removal of the authentication card from the card slot when power of the apparatus is ON,
    wherein the erasing occurs before a next instance when the power of the apparatus is OFF, and
    wherein no authentication information exists in the storing unit while the authentication card is not inserted in the card slot.

11. The computer readable medium storing a program according to claim 10, wherein the process that requires input of authenticating information is a process of appending a digital signature.

12. The computer readable medium storing a program according to claim 10, wherein the erasing the stored authenticating information comprises overwriting the authentication information with other data.

13. The computer readable medium storing a program according to claim 12, wherein the other data comprises all "0s" or all "1s".

* * * * *